US011993156B2

(12) United States Patent
Jauss et al.

(10) Patent No.: US 11,993,156 B2
(45) Date of Patent: May 28, 2024

(54) TEMPERATURE-CONTROL DEVICE FOR AN ENERGY STORE

(71) Applicant: Mahle International GmbH, Stuttgart (DE)

(72) Inventors: Stefan Jauss, Donzdorf (DE); Thomas Kalmbach, Stuttgart (DE); Hans-Martin Ruppert, Ostfildren (DE); Dietmar Wilhelm, Wiernsheim (DE)

(73) Assignee: MAHLE INTERNATIONAL GMBH (DE)

( * ) Notice: Subject to any disclaimer, the term of this patent is extended or adjusted under 35 U.S.C. 154(b) by 18 days.

(21) Appl. No.: 17/725,545

(22) Filed: Apr. 20, 2022

(65) Prior Publication Data

US 2022/0340010 A1 Oct. 27, 2022

(30) Foreign Application Priority Data

Apr. 21, 2021 (DE) .................. 102021203945.6

(51) Int. Cl.
*B60L 3/00* (2019.01)
*B60L 58/26* (2019.01)
(Continued)

(52) U.S. Cl.
CPC ............ *B60L 3/0046* (2013.01); *B60L 58/26* (2019.02); *F28D 9/0093* (2013.01);
(Continued)

(58) Field of Classification Search
CPC .. B60L 3/0046; B60L 58/26; B60L 2240/545; B60L 3/0007; B60L 58/27;
(Continued)

(56) References Cited

U.S. PATENT DOCUMENTS

2010/0206517 A1* 8/2010 Asakura ................. B60K 11/02
165/104.11
2012/0247713 A1* 10/2012 Radermacher ........ H01M 10/63
165/41
(Continued)

FOREIGN PATENT DOCUMENTS

DE 102014204263 A1 9/2015
DE 102014210158 A1 12/2015
(Continued)

OTHER PUBLICATIONS

English abstract for DE-102019109750.
(Continued)

*Primary Examiner* — Claire E Rojohn, III
*Assistant Examiner* — Gustavo A Hincapie Serna
(74) *Attorney, Agent, or Firm* — Fishman Stewart PLLC

(57) ABSTRACT

A temperature-control device of an energy store, e.g., in a motor vehicle, is disclosed. The temperature-control device includes a first circuit, in which a first heat transfer unit and the energy store to be temperature-controlled are arranged and connected to one another in a heat-transferring manner via a first heat transfer medium, and a second circuit, in which a second heat transfer unit and the first heat transfer unit are arranged and connected to one another in a heat-transferring manner via a second heat transfer medium. In at least one line of the first circuit and/or at least one line of the second circuit a predetermined breaking point and/or a predetermined bending point is arranged which upon a predefined force effect interrupts a flow of fluid therethrough.

20 Claims, 1 Drawing Sheet

(51) Int. Cl.
*F28D 9/00* (2006.01)
*H01M 10/613* (2014.01)
*H01M 10/625* (2014.01)
*H01M 10/63* (2014.01)
*H01M 10/6556* (2014.01)
*H01M 10/6568* (2014.01)

(52) U.S. Cl.
CPC ....... *H01M 10/613* (2015.04); *H01M 10/625* (2015.04); *H01M 10/63* (2015.04); *H01M 10/6556* (2015.04); *H01M 10/6568* (2015.04); *H01M 2220/20* (2013.01)

(58) Field of Classification Search
CPC . F28D 9/0093; H01M 10/613; H01M 10/625; H01M 10/63; H01M 10/6556; H01M 10/6568; H01M 2220/20; H01M 10/615; H01M 10/655; Y02E 60/10; B60K 1/00; B60K 2001/005; B60K 2001/008
USPC .......................................................... 165/165
See application file for complete search history.

(56) References Cited

U.S. PATENT DOCUMENTS

| | | | | |
|---|---|---|---|---|
| 2013/0011713 A1* | 1/2013 | Harada | ................... | F28F 13/08 |
| | | | | 429/120 |
| 2013/0122331 A1* | 5/2013 | McDonald | .......... | H01M 10/625 |
| | | | | 429/50 |
| 2014/0272513 A1* | 9/2014 | Sun | ..................... | H01M 10/613 |
| | | | | 429/120 |
| 2015/0147602 A1* | 5/2015 | Bianchi | .............. | B65D 81/2076 |
| | | | | 429/50 |
| 2016/0023688 A1* | 1/2016 | Berger | .................... | B60L 58/26 |
| | | | | 180/65.23 |
| 2017/0005381 A1* | 1/2017 | Harris | ................. | H01M 50/581 |
| 2017/0244141 A1* | 8/2017 | Weicker | .............. | H01M 10/613 |
| 2019/0081374 A1* | 3/2019 | Iancu | ................ | H01M 10/6556 |
| 2019/0263265 A1* | 8/2019 | Ferenczi | ................. | H02J 7/345 |
| 2020/0052356 A1* | 2/2020 | Eadelson | ............ | H01M 10/613 |
| 2020/0307346 A1* | 10/2020 | Kalmbach | ........... | H01M 10/613 |
| 2020/0335830 A1* | 10/2020 | Tucker | ................ | H01M 10/482 |
| 2020/0338998 A1* | 10/2020 | Wainwright | ............ | B60L 53/66 |
| 2020/0403280 A1* | 12/2020 | Ness | ................... | H01M 10/613 |
| 2021/0053689 A1* | 2/2021 | Lynn | ................... | H01M 10/617 |
| 2021/0098838 A1* | 4/2021 | Droulez | ............ | H01M 10/6569 |
| 2021/0184295 A1* | 6/2021 | Azzouz | ............ | H01M 10/6568 |

FOREIGN PATENT DOCUMENTS

| | | | |
|---|---|---|---|
| DE | 102015003119 A1 | 9/2016 | |
| DE | 102017004723 A1 | 11/2018 | |
| DE | 102019109750 A1 | 10/2020 | |
| DE | 102019204270 A1 | 10/2020 | |
| DE | 102019126848 A1 | 4/2021 | |
| DE | 102019007737 A1 | 5/2021 | |
| EP | 2177858 A1 * | 4/2010 | ............. B60K 11/02 |

OTHER PUBLICATIONS

English abstract for DE-102015003119.
English abstract for DE-102019007737.
English abstract for DE-102017004723.
English abstract for DE-102014204263.
English abstract for DE-102014210158.
English abstract for DE-102019126848.

* cited by examiner

TEMPERATURE-CONTROL DEVICE FOR AN ENERGY STORE

CROSS-REFERENCE TO RELATED APPLICATION

This application claims priority to German Application No. DE 10 2021 203 945.6 filed on Apr. 21, 2021, the contents of which are hereby incorporated by reference in its entirety.

TECHNICAL FIELD

The present invention relates to a temperature-control device for an energy store, in particular in a motor vehicle. Apart from this, the invention relates to a motor vehicle, in particular to an electric vehicle, having an energy store and having such a temperature-control device for temperature-controlling, in particular for cooling, the said energy store.

BACKGROUND

In order to be able to increase the efficiency of, in particular, electric vehicles it is necessary to operate the energy stores of these in an optimal temperature window, for the purpose of which temperature-control devices are usually employed, by means of which the energy store can be cooled or heated if required.

In order to again achieve a particularly effective temperature-control of the energy store it can be provided that individual energy store cells of the energy store are in direct contact with a heat transfer medium, for example a dielectric fluid. A dielectric heat transfer medium is required here in order to avoid a short circuit. Here, for example oil can be employed as dielectric fluid which is temperature-controlled via a conventional coolant radiator in a heat transfer unit incorporated in a further circuit. Such a coolant radiator contains a watery heat transfer medium, in particular a glycol-water mixture. In the event of an accident of a motor vehicle equipped with a directly cooled energy store, for example of an electric vehicle, it has to be absolutely avoided however that the watery heat transfer medium present in the circuit of the coolant radiator is mixed with the dielectric heat transfer medium for the direct cooling or temperature-controlling of the electric energy store since it can otherwise happen that when water-containing heat transfer medium enters a directly cooled or temperature-controlled energy store a development of detonating gas (HHO) through electrolysis and, initiated by this, a vehicle fire can occur. Disadvantageously however this cannot be entirely excluded in popular motor vehicles, in particular in popular electric vehicles.

The present invention therefore deals with the problem of stating for a temperature-control device an improved or at least an alternative embodiment, which overcomes in particular the disadvantages known from the prior art.

According to the invention, this problem is solved through the subject of the independent claim(s).

Advantageous embodiments are subject of the dependent claims.

SUMMARY

The present invention is based on the general idea of interrupting a circuit of a heat transfer medium in the event of a crash by simply providing at least one predetermined breaking point and/or one predetermined bending point and by way of this particularly effectively prevent water-containing heat transfer medium undesirably entering a directly cooled energy store. The temperature-control device for an energy store according to the invention has a first circuit, in which a first heat transfer unit and the energy store to be temperature-controlled are arranged and are connected to one another in a heat-transferring manner via a first heat transfer medium. The temperature-control device additionally has a second circuit in which a second heat transfer unit, for example a coolant radiator, and the first heat transfer unit are arranged and connected to one another in a heat transferring manner via a second heat transfer medium. In at least one line of the first circuit and/or in at least one line of the second circuit the predetermined breaking point/predetermined bending point according to the invention is now provided, which, upon a predefined force effect, interrupts a flow of the first heat transfer medium and/or of the second heat transfer medium in the respective associated circuit, but in any case stops access of the second heat transfer medium to the energy store.

By way of this, a crash-induced direct contact of water-containing heat transfer medium with energy storage cells of the energy store and, connected to this, any development of detonating gas that may be accompanied by this under certain conditions and a vehicle fire can be prevented in a comparatively simple manner. Such predetermined breaking points or predetermined bending points can be comparatively easily installed with extremely small installation space requirement so that these, in the event of a vehicle crash, for example in a head-on collision, are easily activated and thereby block the respective circuit, in which they are arranged, by way of a kink or drain the same by way of a breakage. With the predetermined breaking point or the predetermined bending point it can be prevented in particular in the region of the first heat transfer unit in the event of a crash that the second heat transfer medium comes into contact with the first heat transfer medium and because of this the second heat transfer medium is conveyed via the first circuit to the energy store where it initiates under certain conditions a development of detonating gas or a fire.

Practically, the first heat transfer unit is an oil cooler. The first heat transfer medium is usually a dielectric fluid, in particular oil, which with a direct cooling of the energy store, in the case of which the energy storage cells of the same are directly immersed in the first heat transfer medium, is mandatory.

In an advantageous further development of the temperature-control device according to the invention, the second heat transfer unit is a coolant radiator. Such a coolant radiator is generally present in motor vehicles having an internal combustion engine, but also in hybrid vehicles or in pure electric vehicles, wherein in the second heat transfer unit an electrically conductive fluid, usually a glycol-water mixture is cooled. By way of such a coolant radiator however it is not only possible to indirectly temperature-control, in particular cool, via the first heat transfer unit, the first heat transfer medium flowing in the first circuit and thus the energy store, but further heat transfer units can be additionally arranged in the second circuit, for example a refrigerant cooler of an air-conditioning system. Coolant radiators today are known in a great variety of embodiments and have been tested for many years and make possible a comparatively high cooling output with comparatively small installation space requirement.

Here, a heating device can be obviously provided in at least the first circuit, via which the first heat transfer medium flowing in the first circuit and in addition to this the energy store can be heated in order to maintain the same in a temperature window that is optimal for the operation in particular with low ambient temperatures.

Practically, the predetermined breaking point includes a material thinning. Such a material thinning constitutes a weak point which, upon a crash-induced force effect, because of its reduced cross-section compared with the remaining cross-section, breaks and thereby interrupts a flow of the first heat transfer medium in the first circuit or of the second heat transfer medium in the second circuit. Such thinning of material can be comparatively easily produced in terms of manufacture, for example by way of suitable lines produced by means of a plastic injection moulding.

In a further advantageous embodiment of the temperature-control device according to the invention, the predetermined bending point comprises a constriction, a notch or a predefined kink. A predetermined bending point in the region to a predetermined breaking point offers the major advantage that the same merely bends in the event of a crash and thus stops a flow of the heat transfer medium flowing in this circuit, but prevents a leakage of the heat transfer medium into the environment, other than is the case with a predetermined breaking point. Even the non-conclusive listing of the possible embodiments of the predetermined bending point gives an idea of the manifold embodiments that are conceivable here, wherein generally such a predetermined bending point, compared with a predetermined breaking point, is preferable because of the reasons mentioned above.

Practically, the energy store comprises energy storage cells which are in direct contact with the first heat transfer medium. In order to be able to realise a particularly effective cooling, i.e. in particular a direct cooling, directly supplying the energy storage cells with cooling fluid, in particular with a dielectric fluid, is usually preferred since in this case the heat transfer and thus also the cooling output is significantly improved compared with an indirect cooling, for example via a heat transfer plate. By way of this it is significantly more easily possible to maintain the energy store in a temperature window that is optimal for its operation. However, a direct cooling, in the case of which the energy storage cells are in direct contact with the first heat transfer medium, requires the use of a dielectric fluid since short circuits can otherwise occur.

Further, the present invention is based on the general idea of equipping a motor vehicle, in particular an electric vehicle, with an energy store having such a temperature-control device according to the preceding paragraphs for temperature-controlling the said energy store. Here, the motor vehicle according to the invention offers the major advantage that in the event of an accident there is no mixing of an electrically conductive fluid, for example of a glycol-water mixture and of the dielectric fluid, for example of the oil, and thus a direct contact of energy storage cells with the glycol-water mixture, as a result of which in particular a development of detonating gas and under certain conditions even a vehicle fire can be prevented. By way of the predetermined breaking point or the predetermined bending point a direct contact between the second heat transfer medium, for example a water-containing coolant, and the energy storage cell, can be avoided in a comparatively simple manner.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
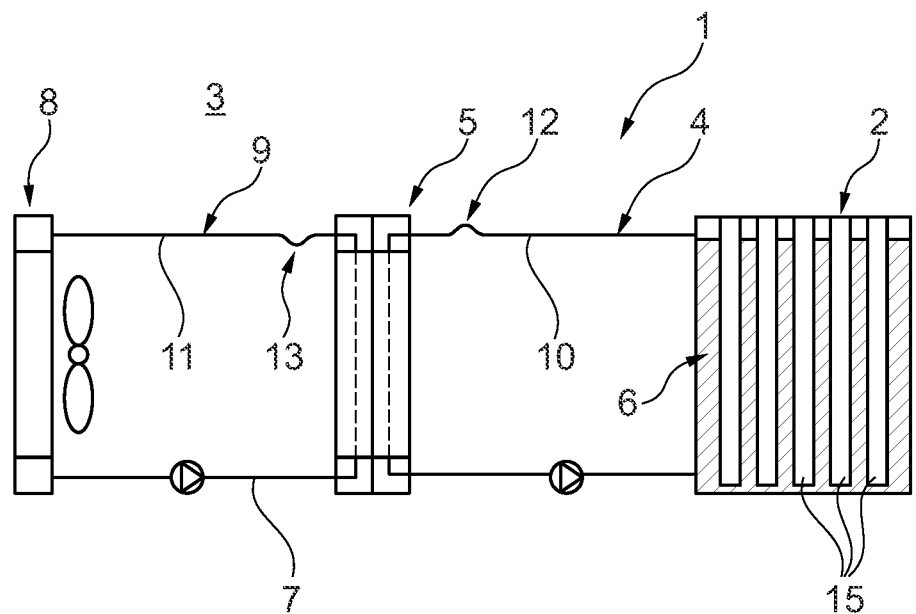
FIG. 1 a temperature-control device for an energy store according to the invention in the normal state with a predetermined bending point and predetermined breaking point, FIG. 2 a representation as in FIG. 1, however after a collision, with bent predetermined bending point and broken predetermined breaking point.
Figure 2:
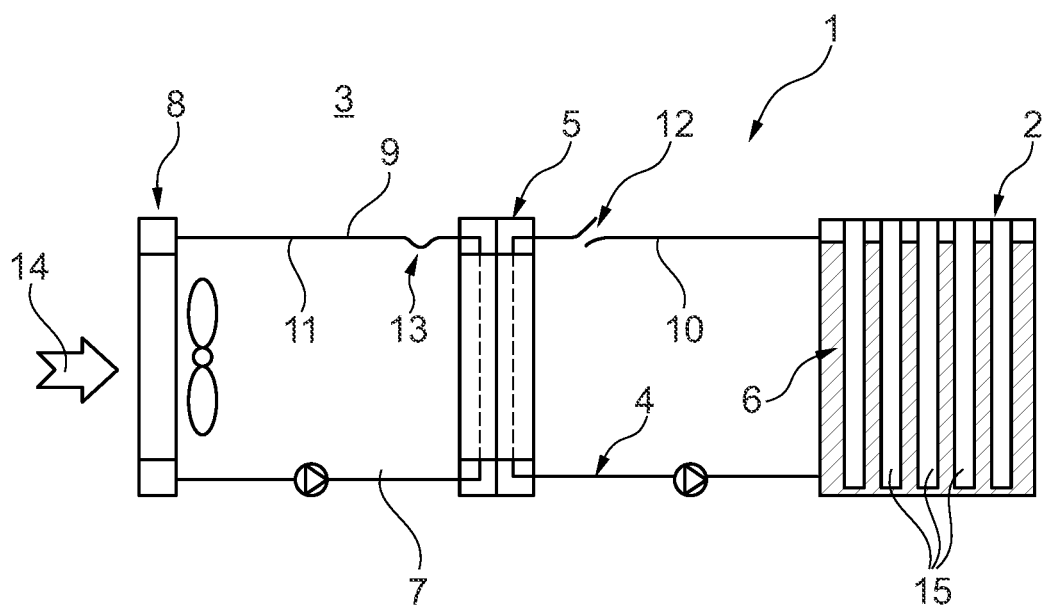

According to FIGS. 1 and 2, a temperature-control device 1 for an energy store 2 according to the invention, in particular in an electric vehicle 3, comprises a first circuit 4, in which a first heat transfer unit 5 and the energy store 2 to be temperature-controlled are arranged and via a first heat transfer medium 6 are connected to one another in a heat-transferring manner. Likewise provided is a second circuit 7, in which a second heat transfer unit 8, in particular a coolant radiator, and the first heat transfer unit 5 are arranged and connected to one another in a heat-transferring manner via a second heat transfer medium 9. Here, a heat transfer between the first heat transfer medium 6, for example a dielectric fluid, in particular oil flowing in the first circuit 4 and a second heat transfer medium 9, for example a glycol-water mixture, flowing in the second circuit 7, takes place in the first heat transfer unit 5.

According to the invention, a predetermined breaking point 12 and/or a predetermined bending point 13 is now arranged in at least one line 10 of the first circuit 4 and/or in at least one line 11 of the second circuit 7, which upon a predefined force effect 14 (see FIG. 2) interrupts a flow of the first heat transfer medium 6 and/or of the second heat transfer medium 9 in the respective associated circuit 4, 7.

According to FIG. 1, the predetermined breaking point 12 is arranged in the line 10 of the first circuit 4 while the predetermined bending point 13 is arranged in the line 11 of the second circuit 7. Here it is obviously conceivable that such a predetermined breaking point 12, alternatively to the predetermined bending point 13, can also be arranged in the line 11 and such a predetermined bending point 13 alternatively to the predetermined breaking point 12, also in the line 10 respectively.

The energy store 2, has energy storage cells 15 which are in direct contact with the first heat transfer medium 6, for example the oil, as a result of which a particularly effective cooling of the energy store 2, compared with an indirect cooling, for example via a heat transfer plate, can be achieved.

In order to be able to bring about an improved cooling of the energy store 2, the first circuit 4 is coupled via the first heat transfer unit 5 to the second circuit 7 in a heat-transferring manner, so that the coolant radiator or generally a second heat transfer unit 8, brings about a cooling of the first heat transfer medium 6 via the first heat transfer unit 5, which can be formed for example as oil cooler. This is particularly advantageous since via the coolant radiator further units of the electric vehicle 3, for example a refrigerant cooler of an air-conditioner or a transmission oil cooler can be temperature-controlled, in particular cooled.

In the event of a vehicle crash, for example upon a rear-end collision, a force effect 14 (see FIG. 2) acts on a front end of the electric vehicle 3, upon which the second heat transfer unit 8 arranged for example at the front end, i.e. the coolant radiator, can be displaced. Purely theoretically, this can result in the first heat transfer unit 5 being damaged, so that in the most unfavourable case a mixing of the second heat transfer medium 9, which usually contains water, and of the dielectric first heat transfer medium 6 in the first heat transfer unit 5 is to be expected, so that during the further course entry of the water-containing second heat transfer medium 9 in the energy store 2 and access to the energy storage cells 15 can take place which, there, can again result in a development of detonating gas and a vehicle fire or a short circuit under certain conditions.

To prevent this or at least lower a risk in this regard, the predetermined breaking point 12 or the predetermined bending point 13, which upon a predefined force effect 14, for example upon an accident, breaks or bends and thereby prevents a mixing of the two heat transfer media 9, 6 and a direct contact of the second heat transfer medium 9 with the energy storage cells 15 are provided.

The predetermined breaking point 12 can be formed for example as a material thinning or as a brittle development which breaks from a predefined force, as a result of which the dielectric fluid, i.e. the first heat transfer medium 6, can no longer or only for a short period flow in the first circuit 4. The predetermined breaking point 12 can be arranged either in a supply line to the first heat transfer unit 5 or a discharge line from the same.

Mere, the predetermined bending point 13 can be formed for example as a constriction, as a notch or as a predefined kink and arranged in a supply line or discharge line to the first heat transfer unit 5. Purely theoretically, an arrangement directly at the first heat transfer unit 5 or at the second heat transfer unit 8 is obviously also conceivable. The advantage of the predetermined bending point 13 is in particular that the same, upon a predefined force effect 14, bends and stops a further flow of the second heat transfer medium 9 in the second circuit 7 or, upon an arrangement in the first circuit 4, a flow of the first heat transfer medium 6 flowing there, but prevents a draining of the respective heat transfer medium 9, 6, as is to be expected in the case of a predetermined breaking point.

At least one line 10 in the first circuit 4 and/or the at least one line 11 in the second circuit 7 can be formed of plastic or of metal, as a result of which a formation of the predetermined breaking point 12 or of the predetermined bending point 13 is comparatively easily possible. Such a predetermined breaking point 12 or predetermined bending point 13 can also be inserted into the line 10, 11 as a prefabricated component.

With the temperature-control device 1 according to the invention and the motor vehicle according to the invention, in particular the electric vehicle 3, damage such as for example a short circuit, a development of detonating gas or even a vehicle fire in the event of a vehicle crash can be prevented, but at least a risk for this reduced.

The invention claimed is:

1. A temperature-control device of an energy store, comprising:
  a first circuit, in which a first heat transfer unit and the energy store to be temperature-controlled are arranged and connected to one another in a heat-transferring manner via a first heat transfer medium,
  a second circuit, in which a second heat transfer unit and the first heat transfer unit are arranged and connected to one another in a heat-transferring manner via a second heat transfer medium,
  wherein in at least one of at least one line of the first circuit and at least one line of the second circuit at least one of a predetermined breaking point and a predetermined bending point is arranged which upon a predefined force effect interrupts a flow of at least one of the first heat transfer medium and the second heat transfer medium in the respectively associated circuit, and
  wherein the predetermined breaking point provides a break point with a reduced cross section relative to the reminder of the at least one line, and wherein the predetermined bending point provides a bend in a straight portion of the at least one line.

2. The temperature-control device according to claim 1, wherein the first heat transfer unit is an oil cooler.

3. The temperature-control device according to claim 1, wherein the first heat transfer medium is a dielectric fluid.

4. The temperature-control device according to claim 1, wherein the second heat transfer unit is a coolant radiator.

5. The temperature-control device according to, claim 1, wherein the second heat transfer medium is an electrically conductive fluid.

6. The temperature-control device according to claim 1, wherein the predetermined breaking point comprises a material thinning.

7. The temperature-control device according to claim 1, wherein the predetermined bending point comprises a constriction, a notch or a predefined kink in the at least one line.

8. The temperature-control device according to claim 1, wherein the at least one of the at least one line in the first circuit and the at least one line in the second circuit is composed of plastic or of metal.

9. The temperature-control device according to claim 1, wherein the energy store comprises energy storage cells that are in direct contact with the first heat transfer medium.

10. A motor vehicle, comprising: an energy store and a temperature-control device for temperature-controlling the energy store, the temperature-control device including:
  a first circuit including a first heat transfer unit and the energy store arranged in the first circuit and connected to one another in a heat-transferring manner via a first heat transfer medium;
  a second circuit including a second heat transfer unit and the first heat transfer unit arranged in the second circuit and connected to one another in a heat-transferring manner via a second heat transfer medium;
  wherein in at least one of at least one line of the first circuit and at least one line of the second circuit at least one of a predetermined breaking point and a predetermined bending point is arranged, wherein the at least one of the predetermined breaking point and the predetermined bending point upon a predefined force effect interrupts a flow of at least one of the first heat transfer medium and the second heat transfer medium in the respectively associated circuit; and
  wherein the predetermined breaking point provides a break point with a reduced cross section relative to the reminder of the at least one line, and wherein the predetermined bending point provides a bend in a straight portion of the at least one line.

11. The motor vehicle according to claim 10, wherein the energy store comprises energy storage cells that are in direct contact with the first heat transfer medium.

12. The motor vehicle according to claim 11, wherein the first heat transfer medium is a dielectric fluid.

13. The motor vehicle according to claim 12, wherein the dielectric fluid is oil.

14. The motor vehicle according to claim 10, wherein the first heat transfer unit is an oil cooler.

15. The motor vehicle according to claim 10, wherein the second heat transfer unit is a coolant radiator.

16. The motor vehicle according to claim 10, wherein the second heat transfer medium is an electrically conductive fluid.

17. The motor vehicle according to claim 10, wherein the electrically conductive fluid is a glycol-water mixture.

18. The motor vehicle according to claim 10, wherein the predetermined breaking point includes a material thinning.

19. The motor vehicle according to claim 10, wherein the predetermined bending point includes a constriction, a notch, or a predefined kink in the at least one line.

20. The motor vehicle according to claim 10, wherein the at least one of the at least one line in the first circuit and the at least one line in the second circuit is composed of plastic or of metal.

* * * * *